Nov. 1, 1932.  R. MORRIS  1,886,295
FRUIT FEEDING DEVICE
Filed April 22, 1929
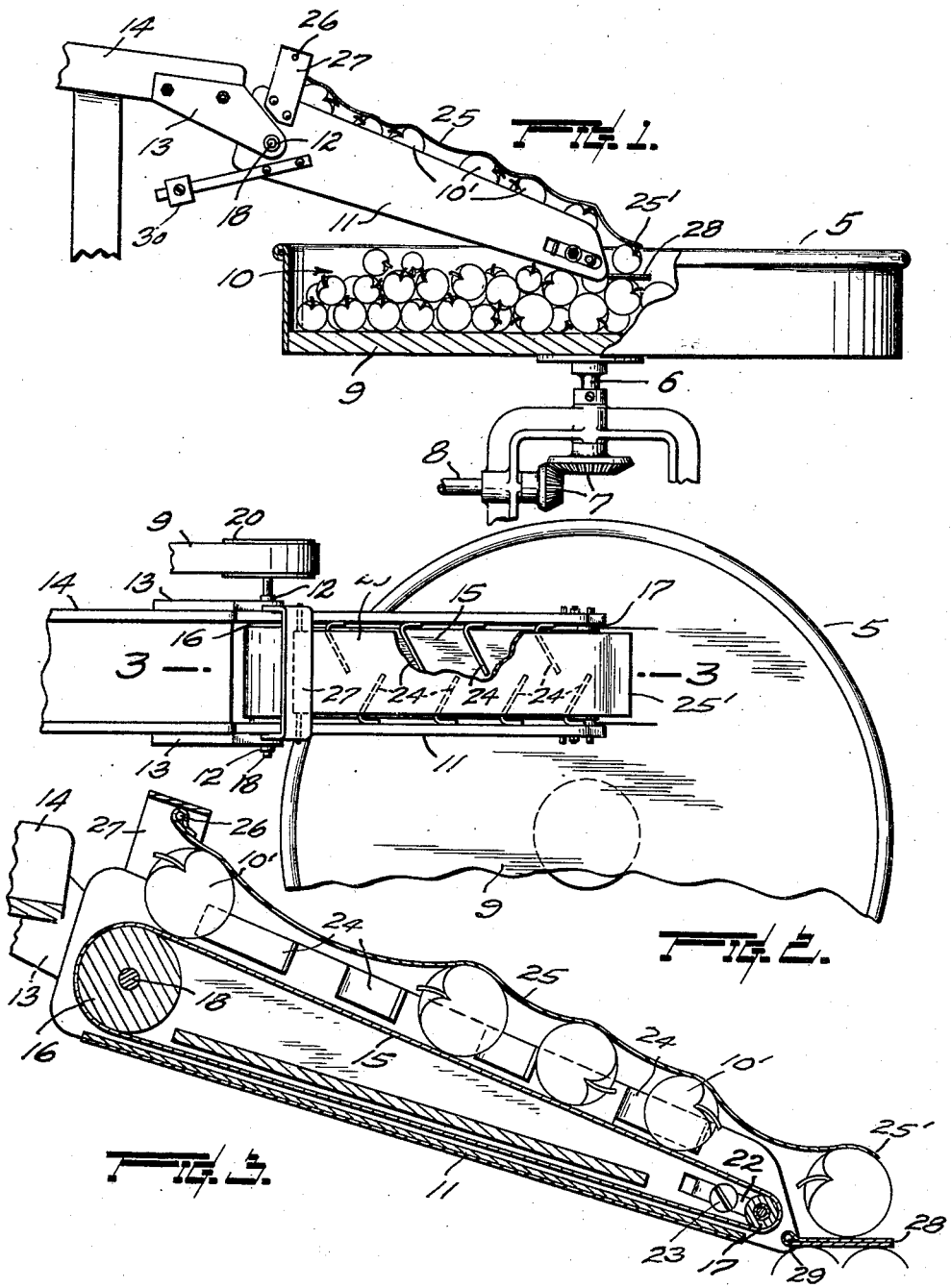
INVENTOR
Ross Morris
BY
ATTORNEY Patented Nov. 1, 1932

1,886,295

UNITED STATES PATENT OFFICE

ROSS MORRIS, OF ZILLAH, WASHINGTON

FRUIT FEEDING DEVICE

Application filed April 22, 1929. Serial No. 356,964.

This invention relates to feeding devices by which apples, peaches and other fruit are delivered upon a sorting or grading table and, more especially in connection with a rotary bin such as illustrated and described in U. S. Patent No. 1,656,444, issued to me January 17, 1928.

The object of the invention is to provide novel and efficient devices by which the fruit is conveyed and deposited carefully upon the table or bin without danger of bruising or otherwise injuring the fruit.

More specific objects and advantages of the invention will appear in the following description.

In general the invention consists in the provision of a fruit delivery trough hingedly connected at one end to a supply trough or an equivalent, so that the free end of the delivery trough may automatically be swung up or down as may be required to suit the work, and containing a power driven belt by which the fruit is conveyed to a pad provided at the discharge end of the delivery chute, and means associated with the belt for regulating the travel of the fruit thereon.

The invention consists also in the novel construction, adaptation and combinations of parts hereinafter described and claimed.

In the accompanying drawing,—

Figure 1 is a side elevation of apparatus embodying my invention applied to a rotary bin which is shown partly in longitudinal vertical section; Fig. 2 is a plan view of Fig. 1 with parts broken away; and Fig. 3 is a detail longitudinal vertical section taken substantially on line 3—3 of Fig. 2 to illustrate the action of the fruit transporting and retarding appliances.

In said drawing, the reference numeral 5 represents a bin mounted for rotation on a vertical shaft 6 which may be driven as by means of bevel gears 7 from a power shaft 8.

Said bin is provided with a floor 9 upon which fruit, as apples—indicated by 10 in Fig. 1—is received from the delivery chute 11 of the feeding apparatus.

As shown, said delivery chute 11 is pivotally connected by means of transversely arranged bushings 12 to bracket members 13 of a trough 14 through which fruit is supplied to the chute 11.

Provided within said chute is an endless belt 15, preferably of canvas, passing around a live roller 16 and an idle roller 17 at opposite ends, respectively, of the chute.

Said live roller is mounted upon a shaft 18 journaled in the bushings 12 and is rotated to drive the belt 15 by suitable means such, for example, as a power belt 19 passing about a pulley 20 (Fig. 2) mounted upon the roller shaft 18.

The idler roller 17 is adapted to serve as a tightener for the belt 15 and for this purpose has the ends of its axle 21 mounted in attachments 22 to be shiftable longitudinally of the chute, which attachments are secured in adjusted positions by means of headed bolts, such as 23 (Fig. 3), engaging the side walls of the chute.

According to the present invention, I provide above the upper, or fruit carrying run of the belt 15, a plurality of flaps 24, of heavy fabric or rubber, which are secured to and extend alternately from the opposite side walls of the chute to about the midwidth of the chute as represented in Fig. 2.

Said flaps act successively upon fruit as $10^1$ (Figs. 1 and 2) carried by the belt 15 to retard the travel of the fruit, especially when the chute and its belt are disposed in a relatively steep slope such as would permit the fruit rolling down the belt at a speed greater than the travel of the belt.

The travel of the fruit on the belt is further restrained by what I term the drape which consists of a strip 25 of canvas or other suitable flexible material having one of its ends connected by means of a transversely arranged rod 26 to a wicket 27 secured to the chute adjacent its front or receiving end. The strip 25 is disposed above the fruit $10^1$ in transit upon the conveyor belt 15 to extend with a free extremity as at $25^1$ beyond the delivery end of the chute.

28 represents an apron of a soft or yieldable material connected by means of a transversely arranged rod 29 to the delivery end of the chute and extending beyond the latter to serve as a landing pad, so to speak, to cushion the fruit successively leaving the chute to safeguard such fruit from becoming bruised and also to prevent bruising other fruit already in the bin.

30 represents a heavy body acting counter to the weight of a chute to prevent its free end bearing too heavily upon underlying fruit, as 10, Fig. 1, such facilitates a ready lift of the chute in rising over successive fruit contained by a rotating bin which may contact the under side of the same.

The invention is particularly advantageous when used in controlling apples, peaches, pears and other like fruit which are peculiarly liable to injury from rough usage.

What I claim is,—

1. In apparatus of the character described, the combination with a bin rotatable about a vertical axis and adapted to contain fruit for grading the same, and a pivoted chute having a power driven feed belt therein for depositing the fruit in said bin, said chute being disposed tangentially of an arc taken about said bin axis, of a fruit landing apron of a yieldable material secured to said chute and extending into said bin to overlie fruit previously deposited therein, said chute belt being adapted to deliver fruit to the upper surface of said apron, fruit retarding flaps of a yieldable material extending from opposite sides of the chute into the path of travel of the fruit upon said belt, a drape suspended from the upper end of said chute to frictionally overlie fruit traveling with the belt, said last named means projecting the length of the chute and over the apron to co-operate with the latter in retarding a delivery of the fruit to the bin.

2. In apparatus of the character described, the combination with a receiving bin, and an inclined member for delivering fruit to said bin, said member having a landing apron of a yieldable material secured to the lower discharge end thereof to overlie fruit previously deposited in the bin, and yieldable flaps projecting inwardly from opposite sides of said member and directively of the fruit travel for retarding the travel of the fruit in said member, of a drape disposed above the floor of said member and having its upper end secured to the member to frictionally retard the fruit travel, the lower free end of said drape extending over the landing apron to co-operate therewith in retarding discharge of the fruit to the bin.

3. In apparatus of the character described, the combination with a receiving bin, and an inclined member for delivering fruit to said bin, said member having a landing apron of a yieldable material secured to the lower discharge end thereof to overlie fruit previously deposited in the bin, and yieldable flaps projecting inwardly from opposite sides of said member and directively of the fruit travel for retarding the travel of the fruit in said member, of a drape disposed above the floor of said member and having its upper end secured to the member to frictionally retard the fruit travel.

4. In apparatus of the character described, the combination with a rotatable receiving bin and fruit delivery mechanism therefor, said mechanism pivotally supported for automatic swing activity in a manner to maintain the delivery end thereof in the approximate plane of the fruit level in said bin, of a drape adapted to overlie the fruit for frictional engagement therewith secured at its upper end to the mechanism, extending the approximate length thereof, and projecting beyond the delivery end of the same, said projecting end of the drape acting to prevent bruising of the fruit by contact of the delivered fruit with those previously deposited in the bin by retarding the speed of discharge from the mechanism.

5. In fruit feeding devices, in combination, a bin rotatable about a vertical axis, and delivery mechanism therefor projecting into said bin at a tangent to an arc taken about said bin axis, said mechanism having a landing apron of a yieldable material projecting from its delivery end and adapted to overlie the fruit previously deposited in said bin to prevent bruising of the same by the successive deliveries of fruit from said mechanism.

6. In fruit feeding devices, the combination with a bin rotatable about a vertical axis, mechanism projecting therein for delivering the fruit to said bin, said mechanism being pivotally supported for automatic swing activity in a manner to maintain the delivery end thereof in the approximate plane of the fruit level in said bin, of an apron of a yieldable material secured to the free delivery end of said mechanism and adapted to overlie the fruit in said bin, said apron serving as a landing to prevent bruising or puncturing of the previously deposited fruit by the succeeding fruit delivered thereover.

Signed at Zillah, Washington, this 23rd day of March, 1929.

ROSS MORRIS.